US011890767B2

(12) United States Patent
Sheng

(10) Patent No.: US 11,890,767 B2
(45) Date of Patent: Feb. 6, 2024

(54) TOOL WITH LATCH ASSEMBLY

(71) Applicant: CORVESCO CO. LTD., Buford, GA (US)

(72) Inventor: Xu Wen Sheng, Qingdao (CN)

(73) Assignee: CORVESCO CO. LTD., Buford, GA (US)

( * ) Notice: Subject to any disclaimer, the term of this patent is extended or adjusted under 35 U.S.C. 154(b) by 0 days.

(21) Appl. No.: 17/987,920

(22) Filed: Nov. 16, 2022

(65) Prior Publication Data

US 2023/0071464 A1 Mar. 9, 2023

Related U.S. Application Data

(63) Continuation of application No. 16/744,362, filed on Jan. 16, 2020, now abandoned.

(60) Provisional application No. 62/768,597, filed on Nov. 16, 2018.

(51) Int. Cl.

*B26D 7/02* (2006.01)
*B26D 5/16* (2006.01)
*B26D 1/08* (2006.01)

(52) U.S. Cl.

CPC ................. *B26D 7/02* (2013.01); *B26D 5/16* (2013.01); *B26D 1/08* (2013.01)

(58) Field of Classification Search

CPC ............... B26D 7/02; B26D 5/16; B26D 1/08
See application file for complete search history.

(56) References Cited

U.S. PATENT DOCUMENTS

| | | | | |
|---|---|---|---|---|
| 2,633,183 A * | 3/1953 | Norquist | A47C 4/10 297/41 |
| 5,590,928 A * | 1/1997 | Voiculescu | E05C 17/446 292/338 |
| 2009/0206639 A1* | 8/2009 | Bearup | A47D 1/002 297/151 |

* cited by examiner

*Primary Examiner* — Evan H MacFarlane
*Assistant Examiner* — Liang Dong
(74) *Attorney, Agent, or Firm* — Locke Lord LLP; Tim Tingkang Xia, Esq.

(57) ABSTRACT

A tool comprises an underbody wall structure having an internal wall and two side walls attached to two ends of the internal wall; and a dual-latch mechanism coupled to the underbody wall structure. The dual-latch mechanism comprises a first latch configured to moveably couple to the underbody wall structure via a first brace affixed to the internal wall; a second latch configured to moveably couple to the underbody wall structure on a side opposite of the first latch, via a second brace affixed to the internal wall; and an integral connection translationally moveable with respect to the underbody wall structure and integrally connecting the first latch to the second latch, wherein moving the first latch in a first direction causes the second latch to move in the first direction. The first latch, the second latch and the integral connection are a monolithic part.

8 Claims, 13 Drawing Sheets

TOOL WITH LATCH ASSEMBLY

CROSS-REFERENCE TO RELATED PATENT APPLICATIONS

This application is a continuation application of U.S. patent application Ser. No. 16/744,362, filed Jan. 16, 2020, which itself claims priority to and the benefit of U.S. Provisional Patent Application Ser. No. 62/768,597, filed Nov. 16, 2018, which are incorporated herein in their entireties by reference.

FIELD OF THE INVENTION

This invention relates to engagement/disengagement assemblies for use with tools involving cutting, chopping, or other machining applications.

BACKGROUND OF THE INVENTION

In certain cutting tools, such as in U.S. Pat. No. 10,086,524, a known engagement/disengagement assembly utilizes interlocking gears between the latch and latch connectors that allow one latch to transmit movement into the opposite latch. Typically, this is done so that a user can keep one hand free while operating the particular tool. However, latches that utilize gear teeth are prone to mechanical wear and interference as well as misalignment and jamming during assembly and operation.

In certain other cutting tools, such as in U.S. Pat. No. 3,702,016, a known engagement/disengagement assembly utilizes a plurality of linkages, springs, and revolute joints to allow pressing action at one point of the tool to cause a corresponding movement at another point on the tool.

Consequently, the foregoing latch mechanisms usually contain numerous parts and very complex routes by which a motion of one latch is transmitted to another. Given the tight cost constraints for the manufacture of cutting tools and ease of repair and replacement of damaged parts, it is desirable to simplify the method by which latches or other structures transmit movement from one side of the cutting tool to the other to allow the user to use his or her hand for another application.

SUMMARY OF THE INVENTION

In one aspect, the invention relates to a tool comprising a underbody wall structure having an internal wall and two side walls attached to two ends of the internal wall; and a dual-latch mechanism coupled to the underbody wall structure.

In one embodiment, the dual-latch mechanism comprises a first latch configured to moveably couple to the underbody wall structure via a first brace affixed to the internal wall; a second latch configured to moveably couple to the underbody wall structure on a side opposite of the first latch, via a second brace affixed to the internal wall; and an integral connection translationally moveable with respect to the underbody wall structure and integrally connecting the first latch to the second latch, wherein moving the first latch in a first direction causes the second latch to move in the first direction. The first latch, the second latch and the integral connection are a monolithic part.

In one embodiment, the dual-latch mechanism further comprises a first spring interconnecting the first latch to the underbody wall structure and a second spring interconnecting the second latch to the underbody wall structure.

In one embodiment, the first spring interconnects the first latch to the underbody wall structure at a point between a free end of the first latch and the integral connection and the second spring interconnects the second latch to the underbody wall structure at a point between a free end of the second latch and the integral connection.

In one embodiment, the first spring interconnects the first latch to the underbody wall structure at the point between the free end of the first latch and the first brace and the second spring interconnects the second latch to the underbody wall structure at the point between the free end of the second latch and the second brace.

In one embodiment, the dual-latch mechanism further comprises a handle connected to the first and second latches and the integral connection for pulling the monolithic part of the first and second latches and the integral connection from a first position in which the monolithic part is closer to the internal wall to a second position in which the monolithic part is farther from the internal wall.

In one embodiment, the handle has an arm connected to the first and second latches and the integral connection via channels, wherein the channels comprise bearings, one or more rollers, or a combination thereof to facilitate movement of the handle.

In one embodiment, the channels further comprise friction surfaces to prevent accidental displacement of the handle.

In one embodiment, each of the first and second braces has a stop to prevent movement of the monolithic part of the first and second latches and the integral connection at certain points.

In one embodiment, each stop is located so as to maintain the first and second latches in the first position.

In one embodiment, each stop is hinged to a respective one of the first and second braces, or is deflected downward as the integral connection is brought into contact therewith.

In one embodiment, each of the first and second braces is a flexible and resilient extension attached to the internal wall, and wherein each stop has sloped surfaces on either side such that when a portion of the integral connection is advanced toward the side of each stop facing toward the internal wall, it causes each stop and its respective brace to deflect downwardly until the integral connection advances past each stop, and when the portion of the integral connection is brought back toward the side of each stop facing away the internal wall, it causes each stop and its respective brace to once again deflect downwardly until the integral connection is brought to rest atop the first and second braces and behind each stop.

In an exemplary embodiment, a dual-latch mechanism for a tool includes a first latch rotatably coupled to the tool, a second latch rotatably coupled to the tool on a side opposite of the first latch, and a joint translationally moveable with respect to the tool and rotatably coupling the first latch to the second latch, wherein moving the first latch in a first direction causes the second latch to move in the first direction.

In another exemplary embodiment, a dual-latch mechanism for a tool includes a first latch rotatably coupled to the tool, a second latch rotatably coupled to the tool on a side opposite of the first latch, and a joint translationally moveable with respect to the tool and rotatably coupling the first latch to the second latch, wherein moving the first latch in a first direction causes the second latch to move in the first direction. The dual-latch mechanism further comprises a first spring interconnecting the first latch to the tool and a second spring interconnecting the second latch to the tool.

In another exemplary embodiment, a dual-latch mechanism for a tool includes a first latch rotatably coupled to the tool, a second latch rotatably coupled to the tool on a side opposite of the first latch, and a joint translationally moveable with respect to the tool and rotatably coupling the first latch to the second latch, wherein moving the first latch in a first direction causes the second latch to move in the first direction. The dual-latch mechanism further comprises a first spring interconnecting the first latch to the tool and a second spring interconnecting the second latch to the tool. According to this exemplary embodiment the first latch and the second latch are also interconnected to the tool via at least one brace.

In another exemplary embodiment, a dual-latch mechanism for a tool includes a first latch rotatably coupled to the tool, a second latch rotatably coupled to the tool on a side opposite of the first latch, and a joint translationally moveable with respect to the tool and rotatably coupling the first latch to the second latch, wherein moving the first latch in a first direction causes the second latch to move in the first direction. The dual-latch mechanism further comprises a first spring interconnecting the first latch to the tool and a second spring interconnecting the second latch to the tool. According to this exemplary embodiment the first latch and the second latch are also interconnected to the tool via at least one brace and the at least one brace extends about the joint.

In another exemplary embodiment, a dual-latch mechanism for a tool includes a first latch rotatably coupled to the tool, a second latch rotatably coupled to the tool on a side opposite of the first latch, and a joint translationally moveable with respect to the tool and rotatably coupling the first latch to the second latch, wherein the joint is located between where the first latch is rotatably coupled to the tool and where the second latch is rotatably coupled to the tool, and wherein moving the first latch in a first direction causes the second latch to move in the first direction.

In another exemplary embodiment, a dual-latch mechanism for a tool includes a first latch rotatably coupled to the tool, a second latch rotatably coupled to the tool on a side opposite of the first latch, and a joint translationally moveable with respect to the tool and rotatably coupling the first latch to the second latch, wherein the joint is located between where the first latch is rotatably coupled to the tool and where the second latch is rotatably coupled to the tool, and wherein moving the first latch in a first direction causes the second latch to move in the first direction. Additionally, according to this exemplary embodiment a first spring may interconnect the first latch to the tool and a second spring may interconnect the second latch to the tool.

In yet another exemplary embodiment, a dual-latch mechanism for a tool includes a first latch rotatably coupled to the tool, a second latch rotatably coupled to the tool on a side opposite of the first latch, and a joint translationally moveable with respect to the tool and rotatably coupling the first latch to the second latch, wherein the joint is located between where the first latch is rotatably coupled to the tool and where the second latch is rotatably coupled to the tool, and wherein moving the first latch in a first direction causes the second latch to move in the first direction. A first spring may interconnect the first latch to the tool at a point between a free end of the first latch and the joint and a second spring may interconnect the second latch to the tool at a point between a free end of the second latch and the joint.

In yet another exemplary embodiment, a dual-latch mechanism for a tool includes a first latch rotatably coupled to the tool, a second latch rotatably coupled to the tool on a side opposite of the first latch, and a joint translationally moveable with respect to the tool and rotatably coupling the first latch to the second latch, wherein the joint is located between where the first latch is rotatably coupled to the tool and where the second latch is rotatably coupled to the tool, and wherein moving the first latch in a first direction causes the second latch to move in the first direction. A first spring may interconnect the first latch to the tool at a point between the free end of the first latch and where the first latch is rotatably coupled to the tool and a second spring may interconnect the second latch to the tool at a point between the free end of the second latch and where the second latch is rotatably coupled to the tool In a still further exemplary embodiment, a dual-latch mechanism for a tool includes a first latch rotatably coupled to the tool, a second latch rotatably coupled to the tool on a side opposite of the first latch, and a joint translationally moveable with respect to the tool and rotatably coupling the first latch to the second latch, wherein the joint passes through a section of the first latch that overlaps a section of the second latch.

In a still further exemplary embodiment, a dual-latch mechanism for a tool includes a first latch rotatably coupled to the tool, a second latch rotatably coupled to the tool on a side opposite of the first latch, and a joint translationally moveable with respect to the tool and rotatably coupling the first latch to the second latch, wherein the joint passes through a section of the first latch that overlaps a section of the second latch. According to this exemplary embodiment, a first spring interconnects the first latch to the tool via an undulating length in the first latch and a second spring interconnects the second latch to the tool via an undulating length of the second latch.

In a still further exemplary embodiment, a dual-latch mechanism for a tool includes a first latch rotatably coupled to the tool, a second latch rotatably coupled to the tool on a side opposite of the first latch, and a joint translationally moveable with respect to the tool and rotatably coupling the first latch to the second latch, wherein the joint passes through a section of the first latch that overlaps a section of the second latch. According to this exemplary embodiment, a first spring interconnects interconnects the first latch to the tool at a point along an undulating length between a free end of the first latch and the joint and a second spring interconnects the second latch to the tool at a point along an undulating length between a free end of the second latch and the joint.

In each of the foregoing embodiments, the dual-latch mechanism may be included in a cutting tool that cuts via rotation of at least one cam, a cutting tool that cuts via a saw blade, that cuts via a drill, that cuts using plasma, or that cuts using instruments and equipment known to those skilled in the art.

Figure 1B:
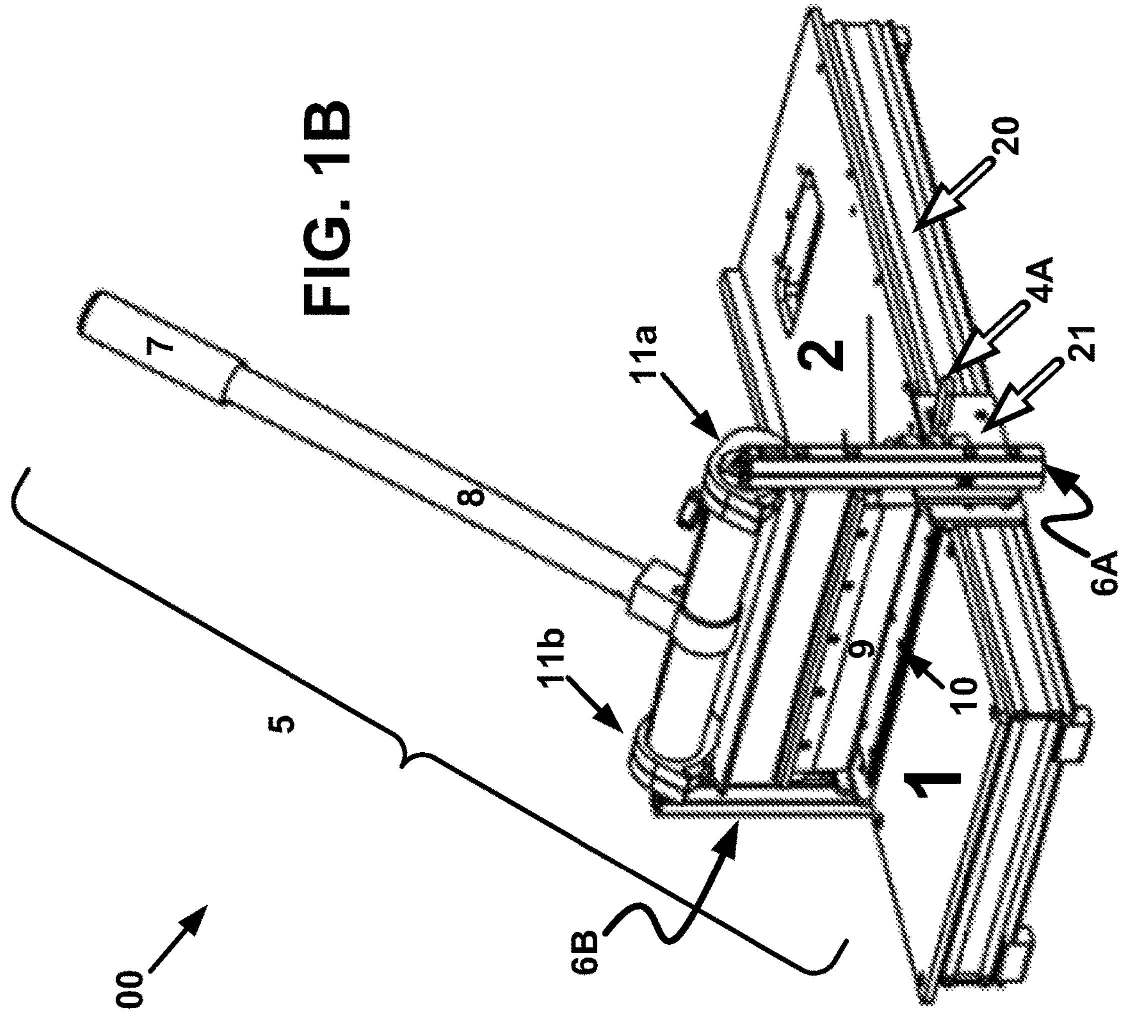
FIGS. 1A and 1B illustrate an exemplary embodiment of a cutting tool in which an exemplary dual-latch mechanism may be utilized.

In the drawings like characters of reference indicate corresponding parts in the different figures. The drawing figures, elements and other depictions should be understood as being interchangeable and may be combined, modified, and/or optimized in any like manner in accordance with the disclosures and objectives recited herein as would be understood to those skilled in the art.

DETAILED DESCRIPTION OF THE INVENTION

Figure 1A:
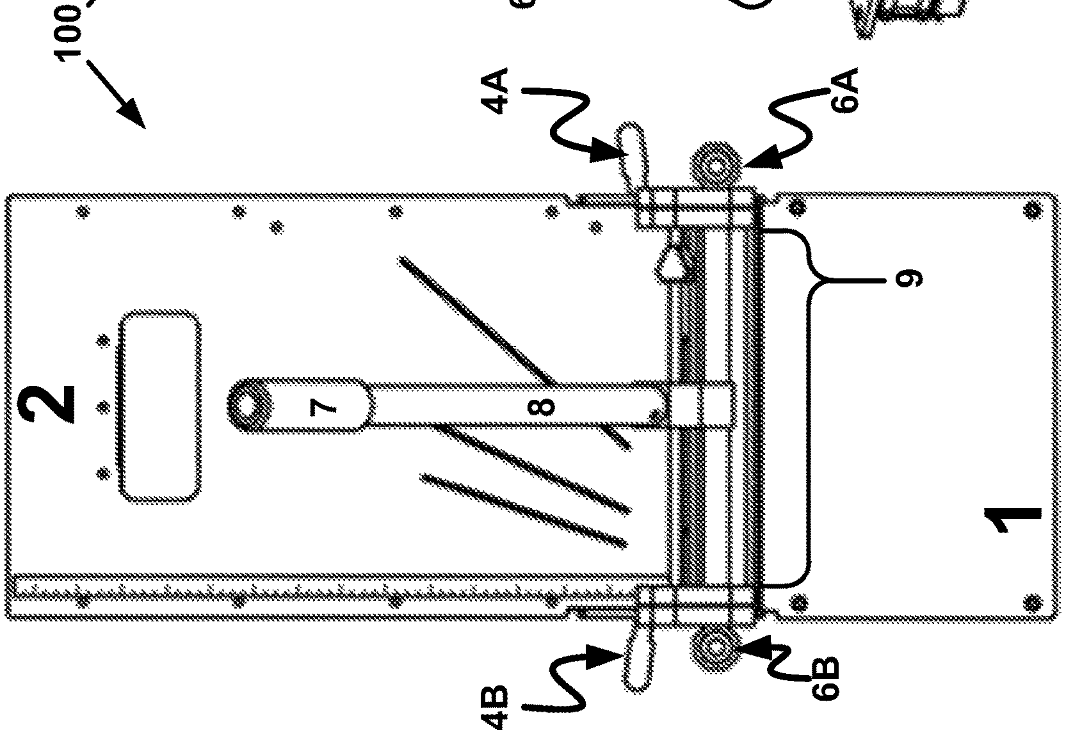

FIGS. 1A and 1B may illustratively provide for a cutting tool 100 in which an exemplary dual-latch mechanism of the type illustrated and described herein may be used. According to the illustrative embodiment of FIGS. 1A and 1B, the cutting tool 100 may be one for cutting flooring panels and tiles, however, the types of cutting tools 100 in which an exemplary dual-latch mechanism may be used may be any form of cutting tools known to those skilled in the art which utilize moving cutting parts or cutting utilities to break apart different materials. Exemplary cutting tools 100 that may take advantage of the features and benefits of en exemplary dual-latch mechanism of the type illustrated and described may include table saws, table CNC plasma cutters, bench cutters (e.g., bolt cutters), milling machines, miter saws, table top jigsaws, universal cutter/grinders, paper cutters, waterjet cutting machine, laser cutters, and any other form of table or bench known to those skilled in the art in or on which material will be cut by an apparatus which utilizes either teeth or energy to break apart a material.

An exemplary cutting tool 100 may comprise a cutting section 1 and a material feeding section 2 on which material to be cut may be loaded. For purposes of establishing an orientation convention, cutting section 1 may be considered the front of the cutting tool 100 while material feeding section 2 is the back. For further purposes of orientation, and unless otherwise specified, all numerals followed by an “A” may denote a component on the left side of the cutting tool 100 while all numerals followed by a “B” may denote a component on the right side of the cutting tool 100. Exemplary cutting tool 100 may have a moveable cutting mechanism 5 comprising at least one handle 7 connected to a cutting utility 9 to enable a user to control the cutting utility 9 to cut material. Exemplary cutting tool 100 may also have a dual-latch mechanism (a portion of which may comprise the free ends of exposed latches 4A and 4B, whereby latch 4A would be the left latch and 4B the right latch) disposed within the underbody walls 20 of cutting tool 100. In an exemplary cutting tool 100 the dual-latch mechanism located within walls 20 of cutting tool 100 may be operated such that one user’s hand may operate only one latch 4A/4B of the dual latch mechanism while another hand may use handle 7 so that an exemplary cutting mechanism 5 may be unlatched on both sides of the cutting tool 100, moved from a prior latched position to a second position, re-latching the cutting mechanism 5 at the second position, and all these steps via a rotation bracket 21. Where an exemplary cutting tool 100 may be a tile cutter, handle 7 may translate a user’s force through a shaft 8 to a pair of cams 11*a* and 11*b* to push down the cutting utility 9 into a cutting space 10 via translation of the cutting utility 9 between two rotational columns 6A (left column) and 6B (right column).

As previously described, a dual-latch mechanism may be utilized to control movement of the cutting utility 9 for cutting tool 100. One such dual-latch mechanism may be illustratively embodied in FIG. 2A as dual-latch mechanism 200. In an exemplary embodiment, an exemplary dual-latch mechanism 200 may be situated between two walls 20A (left wall) and 20B (right wall) connected under material feeding section 2. As illustratively provided, the free end of left latch 4A may be located at depressed position P1 and has a latch connection 4C that may be configured to translate within a slot 19A via a rotational connection at pin/bolt/screw/bearing 16A through brace 15A. In an exemplary embodiment, brace 15A may be affixed to another internal wall 20C of cutting tool 100 by any known mechanical means, including being integral with internal wall 20C. An additional pin or bolt 13 may be used along latch connection 4C to hold one end of a spring 14 while another end of spring 14 is held by a mount 17A. Accordingly, left latch 4A may be rotated via a hinged joint at bolt 16A within the range provided by slot 19A in wall 20A. Further accordingly, as illustratively provided for in FIG. 2A, left latch 4A may return to another position from position P1 via the elastic force in spring 14. The same characteristics, assembly, and operation applied to the foregoing components may be observed with respect to right latch 4B, latch connecter 4C, bolt 16B, brace 15B, pin 13, spring 14, and mount 17B. While braces 15A and 15B may be separate parts, they may be formed as integrated structures for ease of manufacture and cost purposes.

Figure 2A:
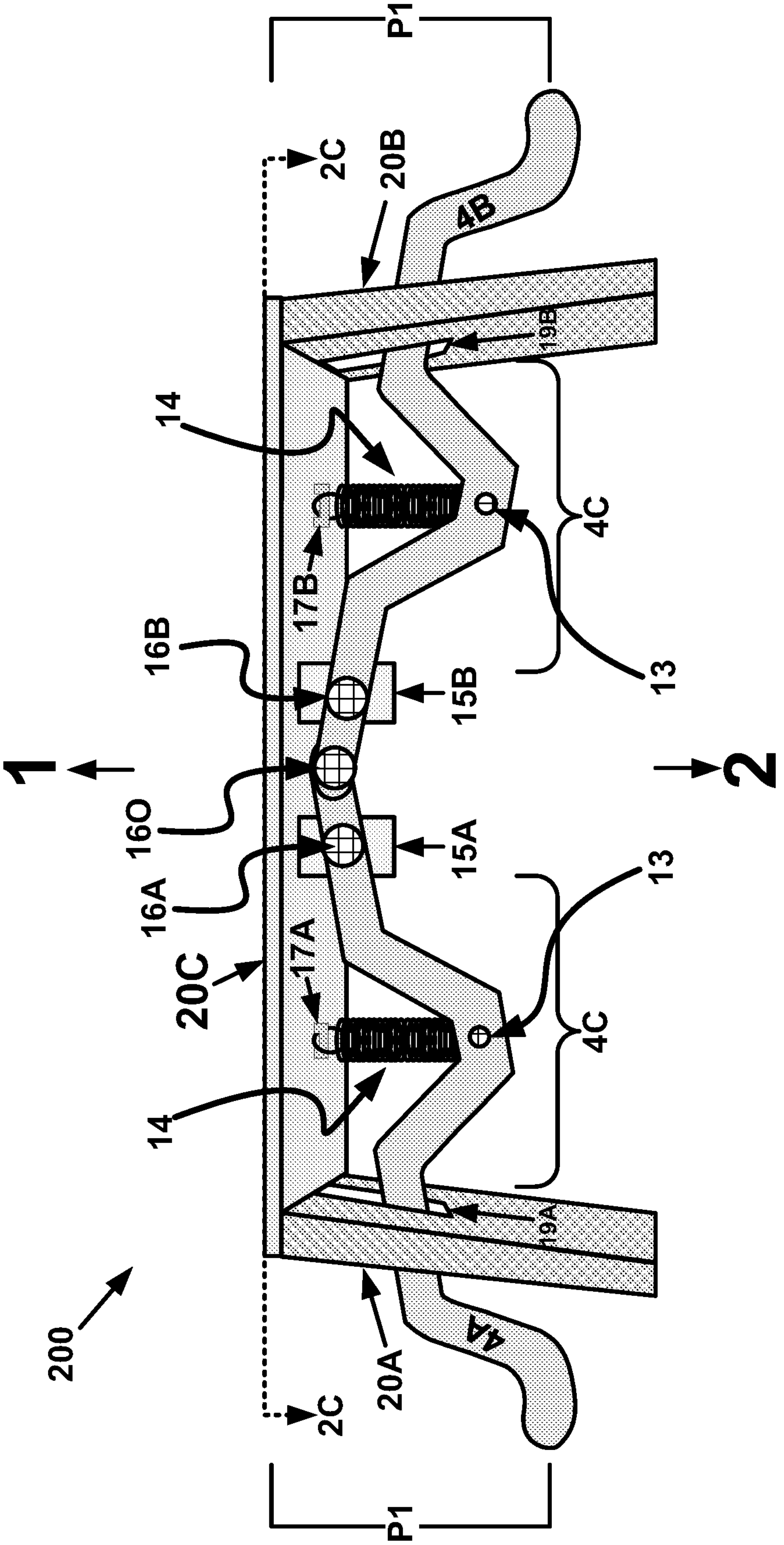
FIG. 2A illustrates an exemplary embodiment of a section of a cutting tool utilizing a first embodiment of an exemplary dual-latch mechanism in a depressed configuration.

With further reference to FIG. 2A, an exemplary dual-latch mechanism 200 may operate to translate the same motion from either of latch 4A or latch 4B via a central bolt 160 which rotationally couples latches 4A and 4B to one another. Thus, deflection of latch 4A may cause latch connection 4C to rotate about bolt 16A at brace 15A. Consequently, such rotation at bolt 16A causes movement at the end of latch connection 4C through which central bolt 160 goes. As central bolt 160 may be moved as a result of deflection of latch 4A, the rotational joint between central bolt 160 and right latch connection 4C causes the same deflection to take place in right latch 4B to position P1. Therefore, rotation of the connections 4C belonging to latches 4A and 4B about bolts 16A and 16B, respectively, causes a translation of bolt 160 in a direction opposite the direction of latch 4A/4B deflection. According to this exemplary embodiment, such may be one exemplary operation of a dual-latch mechanism 200.

Figure 2B:
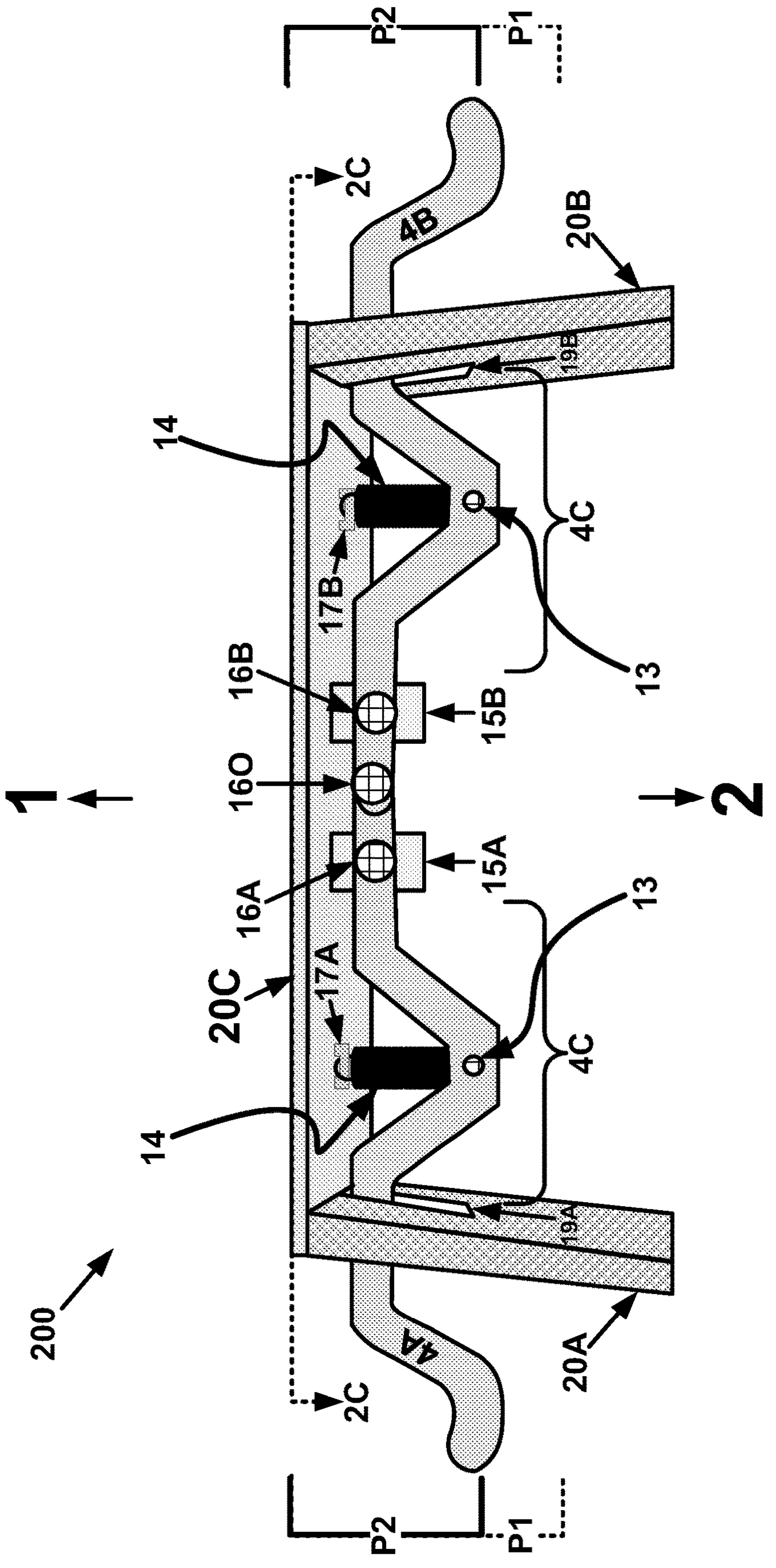
FIG. 2B illustrates an exemplary embodiment of a section of a cutting tool utilizing a first embodiment of an exemplary dual-latch mechanism in an engaged configuration.

In accordance with an illustrative embodiment of FIG. 2B, an exemplary dual-latch mechanism 200 may be engaged so as to prevent movement of cutting mechanism 5 on cutting tool 100. In an exemplary engaged configuration illustratively provided for in FIG. 2B, dual-latch mechanism 200 may have both latches 4A and 4B located at positions P2 within their respective slots 19A and 19B in walls 20A and 20B, respectively. In an exemplary engaged configuration, springs 14 may be found in a relaxed state so that there is substantially no elastic energy contained within its windings. Further, in another exemplary engaged configuration as illustratively provided for in FIG. 2B, bolts 16A, 16B, and 160 may be substantially aligned on the same axis. In yet another exemplary embodiment of an engaged configuration as illustratively provided for in FIG. 2B, pins 13 on latch connections 4C may be aligned on the same axis.

Figure 2C:
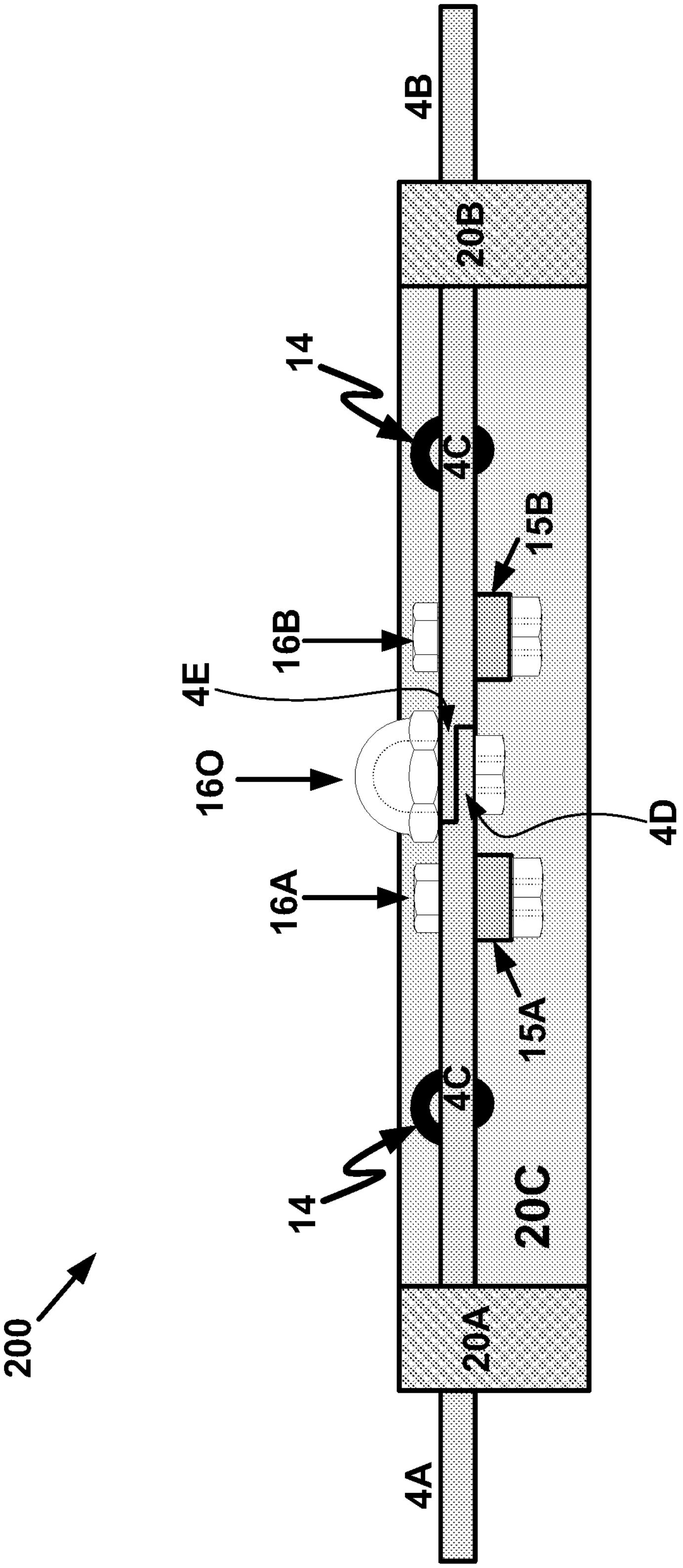
FIG. 2C illustrates an exemplary embodiment of a cross-section of a cutting tool utilizing a first embodiment of an exemplary dual-latch mechanism.

With reference to the embodiment of dual-latch mechanism 200 as illustratively provided for in FIG. 2C, latches 4A and 4B may be shown connected to one another via central bolt 160. As illustrated, latch 4A may have a thin feature 4D configured to overlap with thin feature 4E of latch B such that bolt 160 can pass there through. In one embodiment, both thin feature 4D and 4E may have a slot through which bolt 160 may be connected to allow for certain play during movement of the latches 4A/B of the dual-latch mechanism 200 in cutting tool 100. Alternatively, thin feature 4D and 4E may have a single bore through their thickness for placement of bolt 160. The geometries of thin features 4D and 4E may be such as to facilitate ease of movement while connected via bolt 160. In one embodiment, the outer edges of thin features 4D and 4E may be rounded to facilitate rotational movement while dual-latch mechanism 200 is operated in cutting tool 100. Alternatively, thin features 4D and 4E may be coupled to one another via a rubber diaphragm or a steel washer to increase longevity of the dual-latch mechanism 200, increase range of motion, or preclude debris from work material from cluttering the bolt 160 junction. In yet another alternative embodiment, bolt 160 may be covered or otherwise designed to cover the thin features 4D and 4E and thereby shield the joint formed thereby from falling debris during operation of tool 100, for example, as a hex cap or an enlarged cap/cover that can fit on other bolt or screw heads.

Figure 3A:
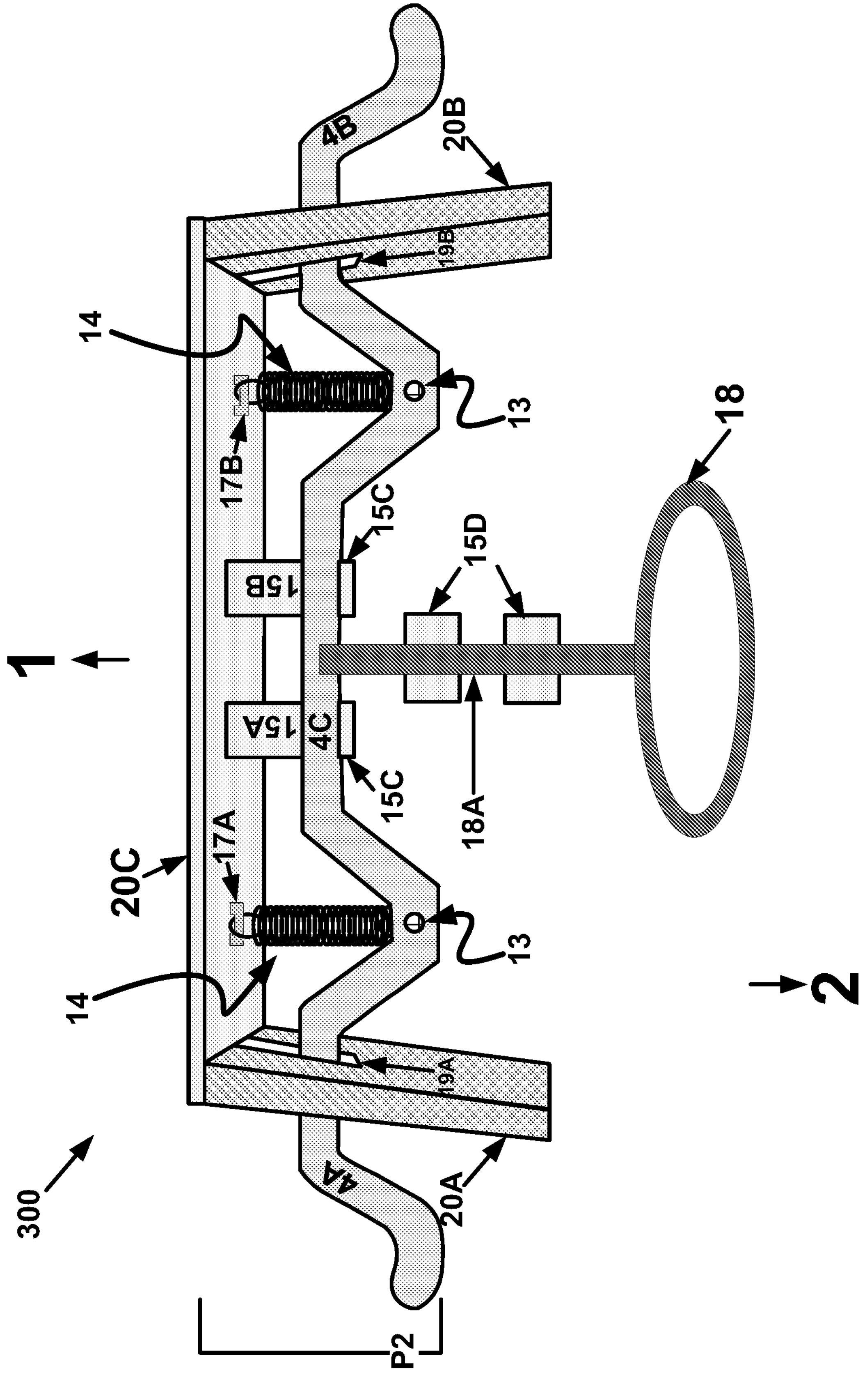
FIG. 3A is an exemplary embodiment of a section of a cutting tool utilizing a second embodiment of an exemplary dual-latch mechanism in a depressed configuration.

FIG. 3A illustratively provides for an exemplary embodiment of a dual-latch mechanism 300 in which much of the dual-latch structure described with respect to FIGS. 2A, 2B, and 2C may be shown, but with differences. For example, an exemplary dual-latch mechanism may not require bolts 16A, 16B, or 160 for its operation, but may instead rely on a spring-pull system in which both latches 4A and 4B are connected to one another via an integral connection 4C and lodged on braces 15A/15B having advance stops 15C to prevent movement after a certain point. In use, dual-latch mechanism 300 may permit a user to pull handle 18 away from the front of the cutting tool 100 along channels 15D so that arm 18A, by which handle 18 may be connected to latches 4A/4B and connection 4C, pulls the latches from a position P1 to a position P2. As the latches 4A/4B and connection 4C are pulled away from the front of the cutting tool 100, springs 14 may be expanded so that spring energies therein may begin to form so as to pull the latches back to a prior position. In this exemplary embodiment, arm 18A may be coupled to the underside of the material feeding section 2 via channels 15D. Such channels 15D may contain bearings, roller(s), or a combination of mechanical features known to those skilled in the art to facilitate fluid movement of the handle 18 and thereby connected latches 4A and 4B.

Figure 3B:
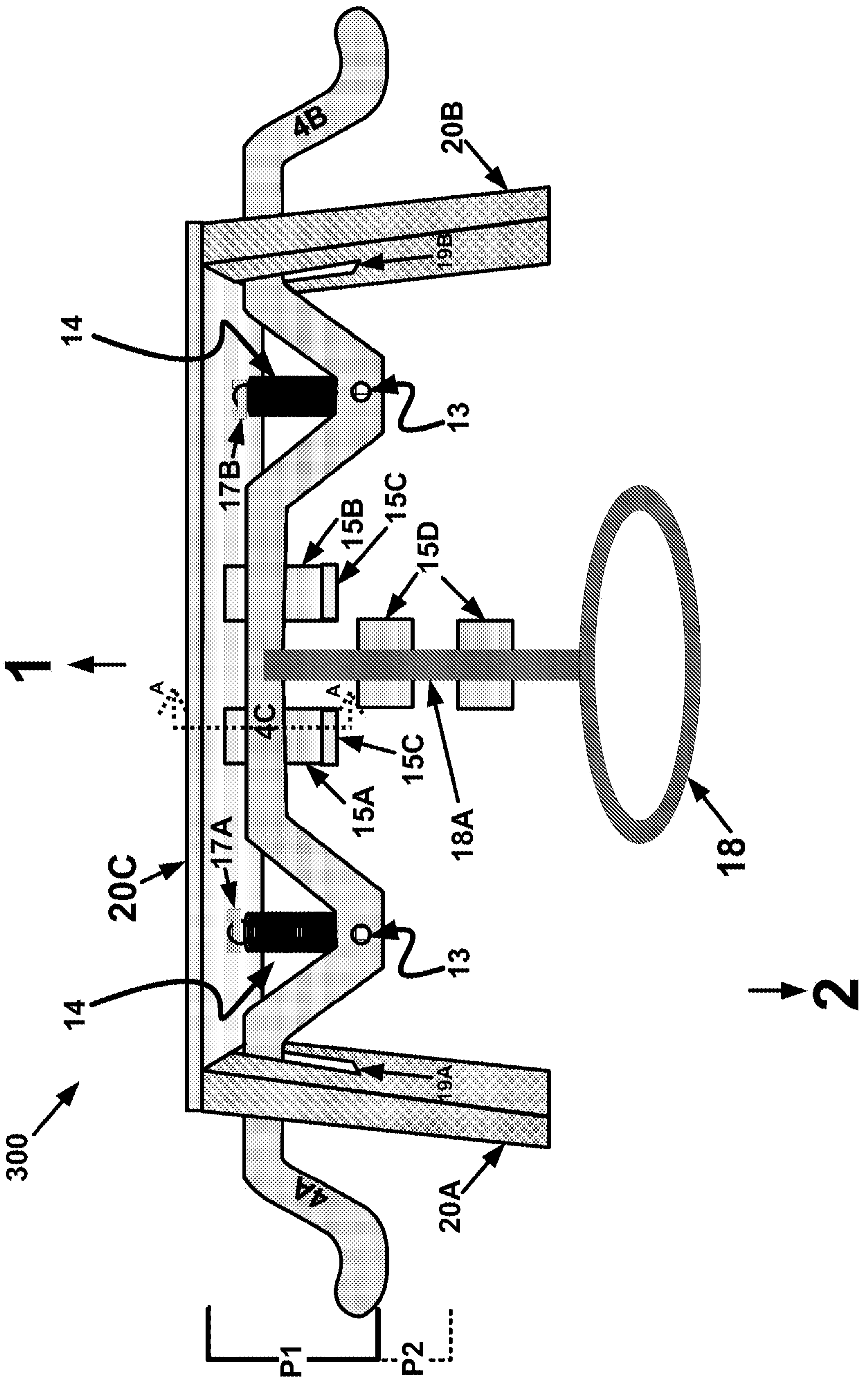
FIG. 3B is an exemplary embodiment of a section of a cutting tool utilizing a second embodiment of an exemplary dual-latch mechanism in an engaged configuration.
Figure 3D:
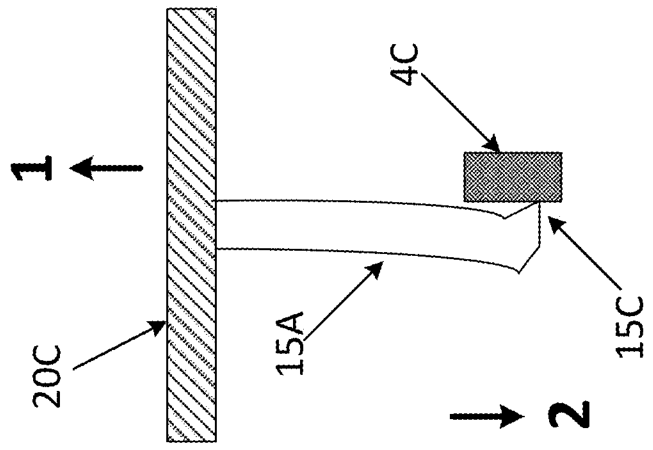
FIG. 3D is schematically a partial cross-sectional of the cutting tool shown in FIG. 3B, showing stop 15C and the brace 15A (15B) are deflected downward as latch connector 4C is brought into contact therewith.
Figure 3C:
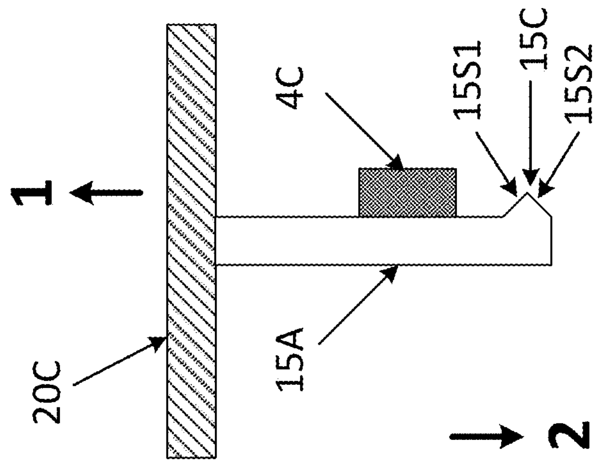
FIG. 3C is schematically a partial cross-sectional of the cutting tool along with line A-A shown in FIG. 3B.

With reference to FIG. 3B, an example of a dual-latch mechanism 300 in a configuration prior to handle 18 being pulled may be illustratively provided. As illustrated, latches 4A and 4B connected by section 4C may be found closer to wall 20C and the front of slats 19A and 19B. In an exemplary configuration where latches 4A and 4B of dual-latch mechanism 300 may be in position P1 rather than position P2, springs 14 may be in a relaxed state so that no elastic energies are residing therein. In an exemplary configuration as illustrated in FIG. 3B, dual-latch mechanism 300 may be in an engaged configuration to prevent movement of moveable cutting mechanism 5. While not shown, channels 15D may contain friction surfaces to prevent accidental displacement of handle 18, and thus latches 4A and 4B from an engaged position. Alternatively, stops 15C may be located so as to maintain latches 4A and 4B in their engaged position, e.g., position P1, and only with sufficient force on handle 18 may they relent to the movement of latches 4A and 4B. According to this exemplary alternative embodiment, stops 15C may be hinged to braces 15A and 15B or may be deflected downward as latch connector 4C is brought into contact therewith, as shown in FIG. 3D. One example of such a deflection alternative may be achieved is where braces 15A and 15B are flexible and resilient extensions attached to wall 20C and stops 15C may have sloped surfaces 15S1 and 15S2 on either side (a side facing the cutting section 1 of cutting tool 100 and a side facing the material feeding section 2 of cutting tool 100), as shown in FIGS. 3C-3D. Thus, when a portion of latch connector 4C is advanced toward the side of stop 15C facing the cutting section 1, it will cause stop 15C and its respective brace 15A/15B to deflect downwardly until connector 4C advances past each respective stop. Conversely, when the portion of latch connector 4C is brought back toward the side of stop 15C facing the material feeding section 2, it will cause stop 15C and its respective brace 15A/15B to once again deflect downwardly until connector 4C is brought to rest atop braces 15A and 15B and behind stops 15C.

Figure 4A:
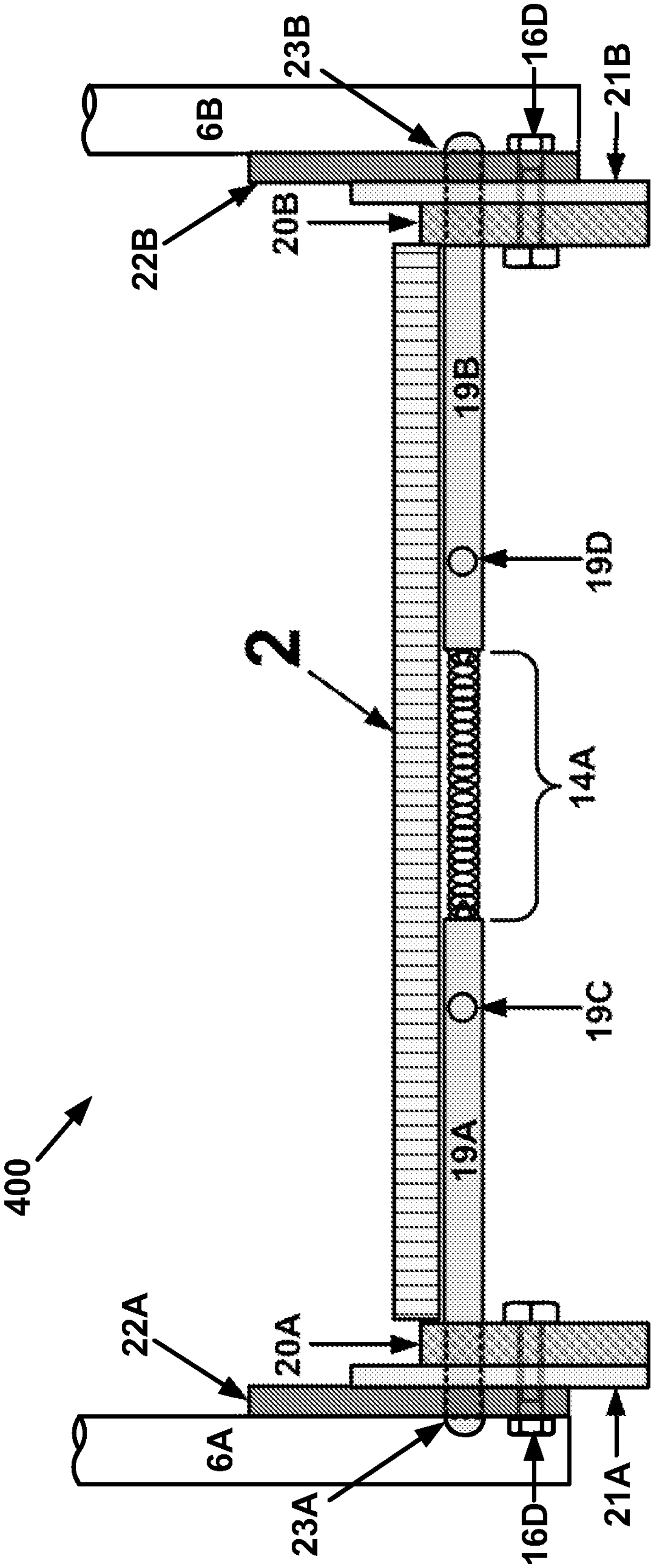
FIG. 4A is an exemplary embodiment of a front view of a section of a cutting tool utilizing a third embodiment of an exemplary dual-latch mechanism in an engaged configuration.
Figure 4B:
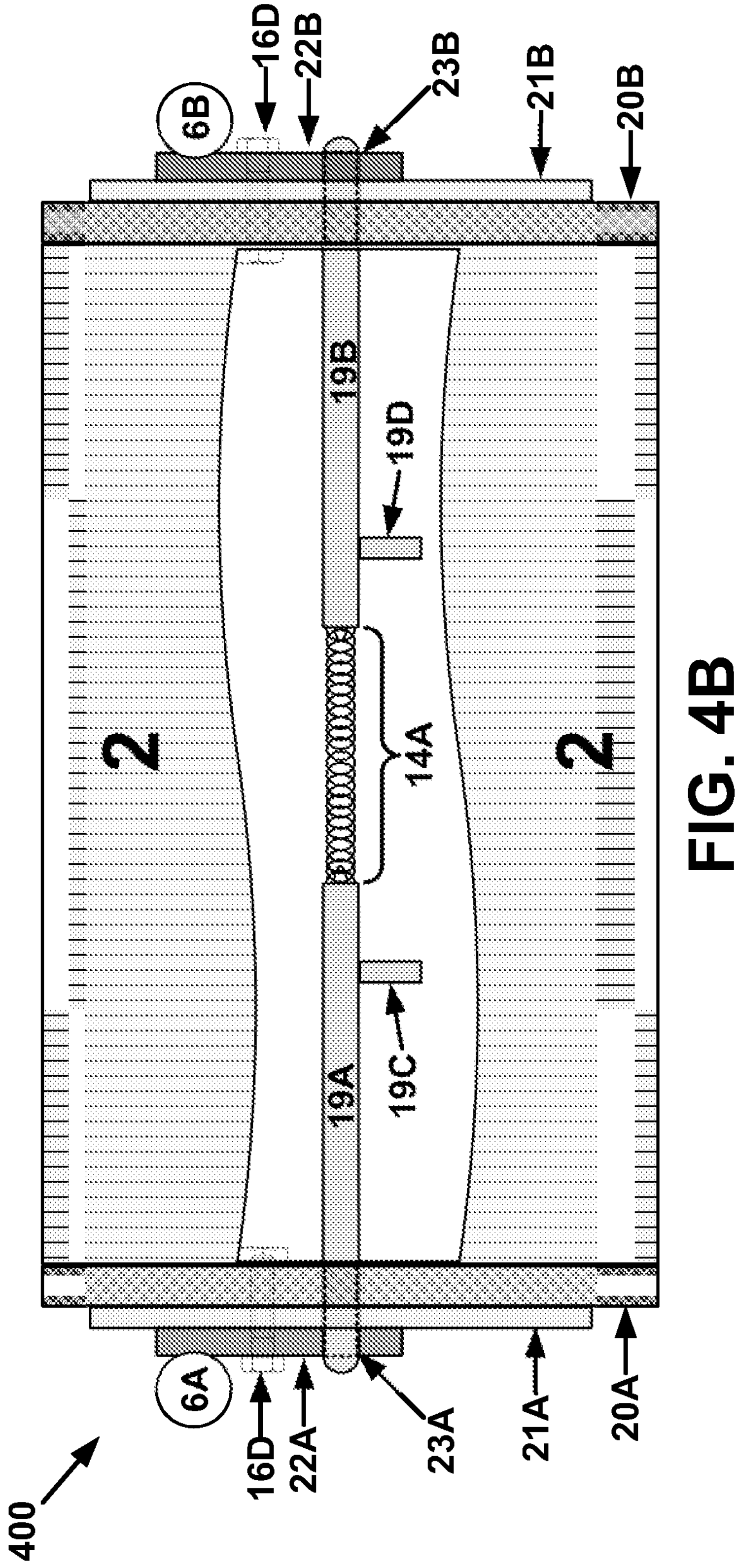
FIG. 4B is an exemplary embodiment of a top view of a section of a cutting tool utilizing a third embodiment of an exemplary dual-latch mechanism in an engaged configuration.

With reference to FIG. 4A, an example of a dual-latch mechanism 400 in an engaged configuration may be illustratively provided. As previously described, a material feeding section/surface 2 may be held by two walls 20A and 20B to which two rotation brackets 21A and 21B may be attached. Rotatable brackets 22A and 22B may be rotatably attached and mechanically engaged to rotation brackets 21A and 21B via a bolt 16D and a latch 19A and 19B, respectively. While bolt 16D may be a preferred rotation mechanism, any known rotating mechanisms may be utilized by persons of ordinary skill in the art, including shafts, gears or ratcheting mechanisms. As illustratively provided for in FIG. 4A, latches 19A and 19B may be coupled to one another by a spring 14A. As further illustrated, press points 19C and 19D allow for movement of latches 19A and 19D in and out of rotatable brackets 22A and 22B, rotation brackets 21A and 21B, and throughbores 23A and 23B, respectively. As illustratively provided for in FIG. 4B, an exemplary top view of a dual-latch mechanism 400 may be shown in an engaged configuration. As shown in both FIGS. 4A and 4B, columns 6A and 6B may be tubular or any other structure which may be utilized to connect moveable cutting mechanism 5 to the rest of cutting tool 100 so that it may be pivoted and moved about the cutting tool 100 by a user.

Figure 4D:
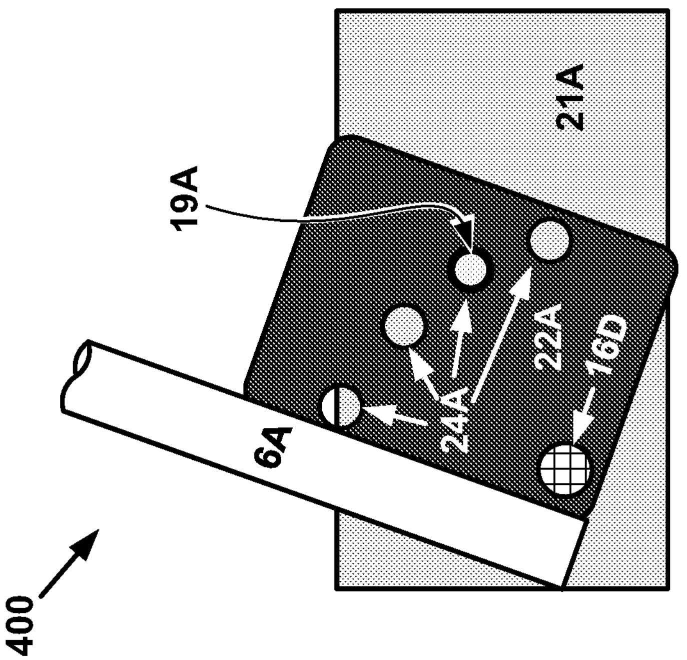
FIG. 4D is an exemplary embodiment of a side view of a section of a cutting tool utilizing a third embodiment of an exemplary dual-latch mechanism in a second engaged configuration.
Figure 4C:
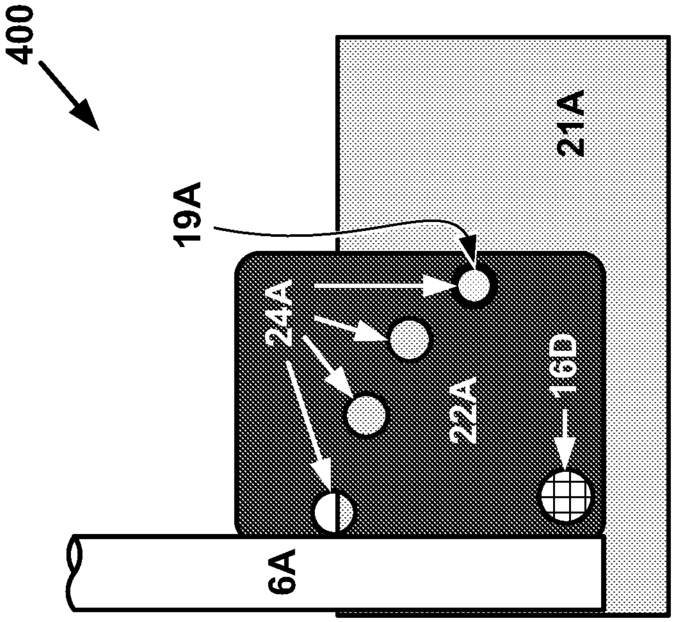
FIG. 4C is an exemplary embodiment of a side view of a section of a cutting tool utilizing a third embodiment of an exemplary dual-latch mechanism in a first engaged configuration.

With reference to a side view of a portion of a cutting tool 100 employing the dual-latch mechanism 400 as illustratively provided for in FIGS. 4C and 4D, rotating bracket 22A may contain a plurality of through holes 24A for receiving a terminal end 19A of latch 19 as it passes through rotation bracket 21A via through bore 23A. As may be observed by comparing FIGS. 4C and 4D, rotating bracket 22A may be revolved about bolt 16D so that terminal end 19A may be compressed back inside throughbore 23A (via the resiliency of spring 14A). Once rotation bracket 22A is oriented as desired, terminal end 19A may be released to thereafter pass through a different through hole 24A so that rotation bracket 22A may be affixed in a different angular arrangement vis-à-vis rotating bracket 21A. Any of the above-described operations of the left side of dual-latch mechanism 400 may be equally applicable to the right side.

Figure 5A:
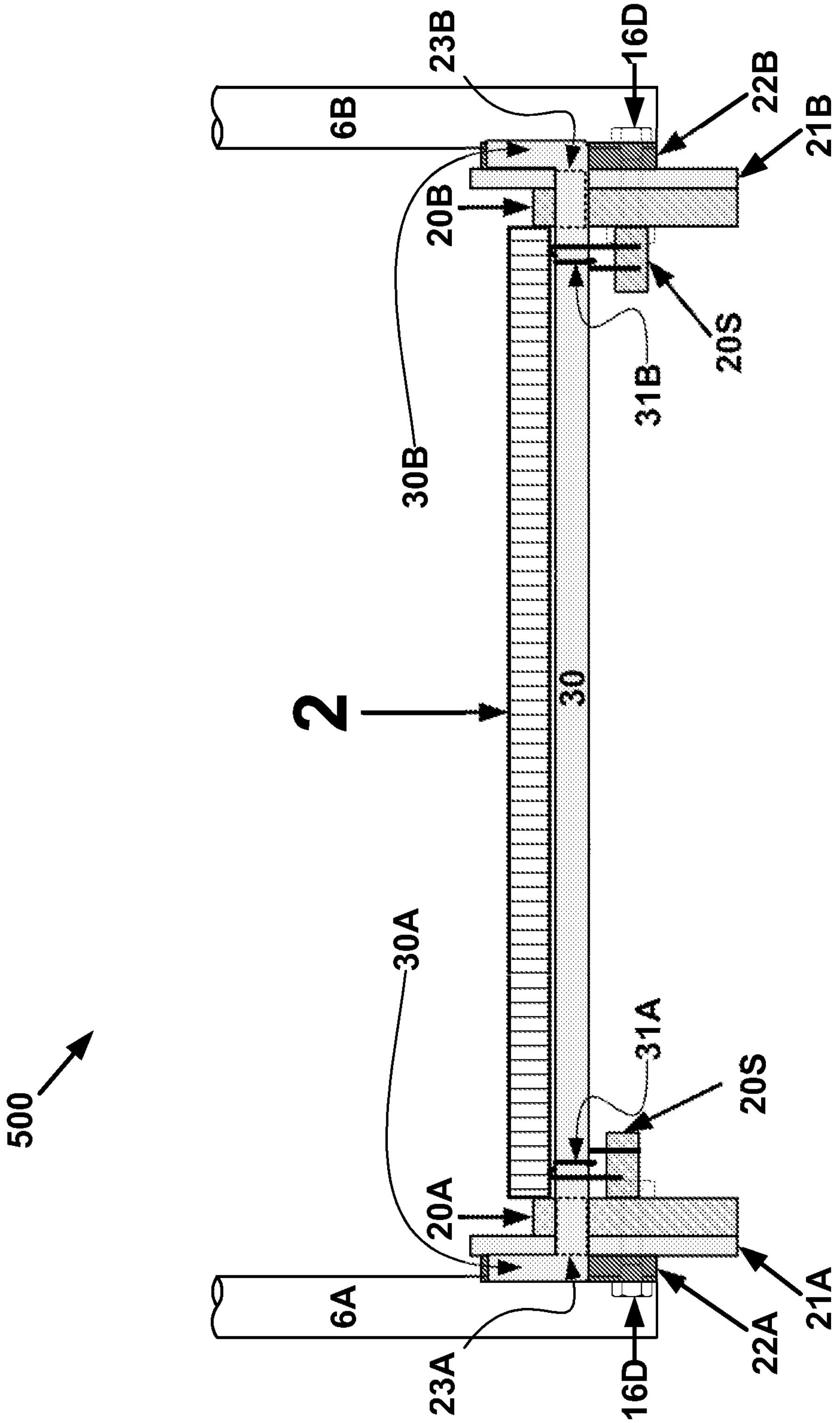
FIG. 5A is an exemplary embodiment of a front view of a section of a cutting tool utilizing a fourth embodiment of an exemplary dual-latch mechanism in an engaged configuration.
Figure 5B:
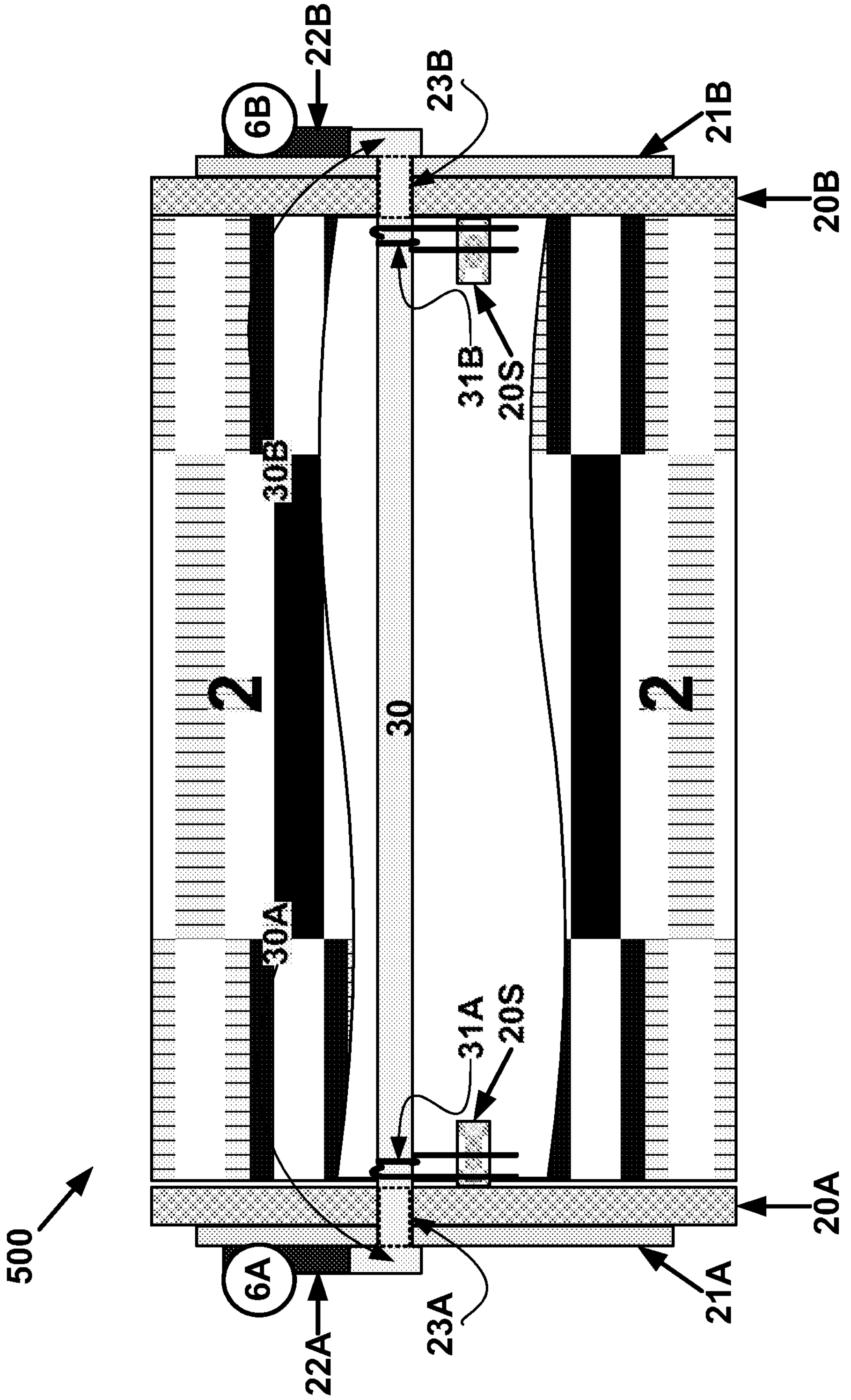
FIG. 5B is an exemplary embodiment of a top view of a section of a cutting tool utilizing a fourth embodiment of an exemplary dual-latch mechanism in an engaged configuration.

Referring to the illustrative embodiment of dual-latch mechanism 500 as shown in FIG. 5A, a view of a portion of cutting tool 100 may provide for the material feeding section 2 held by walls 20A and 20B. As with prior embodiments, rotation brackets 21A and 21B are coupled with rotating brackets 22A and 22B, respectively, via a bolt 16D. As is also again shown, columns 6A and 6B are coupled to rotating brackets 22A and 22B, respectively, to enable pivoting of rotating cutting mechanism 5. In contrast to other embodiments, latch 30 comprises two ratchet ends 30A and 30B, which are coupled to left and right ends of latch 30 via through bores 23A and 23B, respectively. Additionally, latch 30 may be coupled to a surface 20S on the inside of walls 20A and 20B via a resistance spring 31A and 31B, respectively. An above view of the arrangement illustratively provided for in FIG. 5A may be understood with reference to FIG. 5B. In both illustrative embodiments, latch 30 may span the width of cutting tool 100 the material feeding section 2 so that movement of ratchet 30A will move ratchet 30B.

Figure 5C:
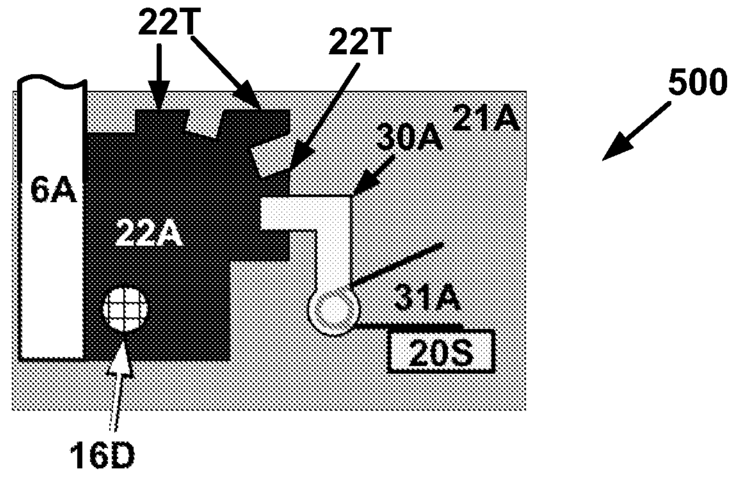
FIG. 5C is an exemplary embodiment of a side view of a section of a cutting tool utilizing a fourth embodiment of an exemplary dual-latch mechanism in a first engaged configuration.
Figure 5D:
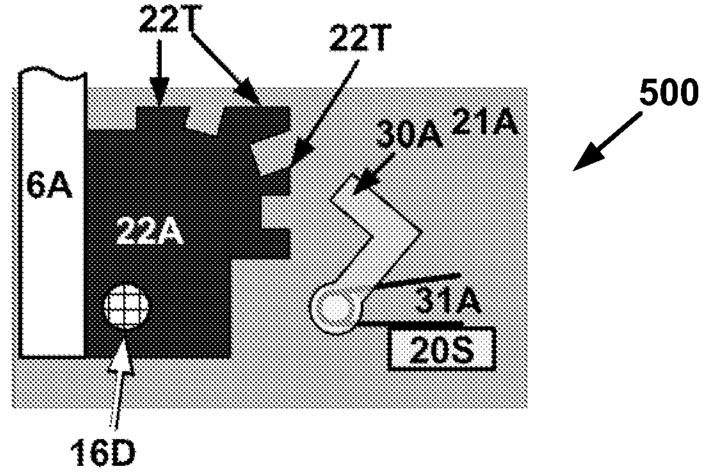
FIG. 5D is an exemplary embodiment of a side view of a section of a cutting tool utilizing a fourth embodiment of an exemplary dual-latch mechanism in a disengaged configuration.
Figure 5E:
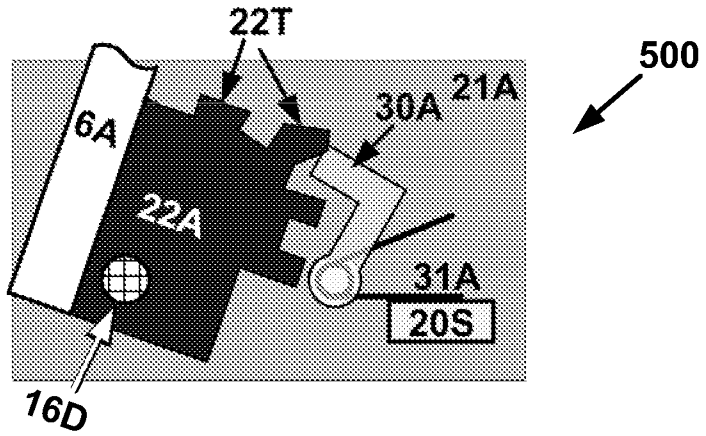
FIG. 5E is an exemplary embodiment of a side view of a section of a cutting tool utilizing a fourth embodiment of an exemplary dual-latch mechanism in a second engaged configuration.

With reference to a side view of a portion of a cutting tool 100 employing the dual-latch mechanism 500 as illustratively provided for in FIGS. 5C, 5D, and 5E, rotating bracket 22A may contain a plurality of teeth 22T for receiving ratchet 30A of latch 30 as it passes through rotation bracket 21A via through bore 23A. As illustrated in FIG. 5C, an exemplary dual-latch mechanism 500 may be at rest in an engaged configuration between teeth 22T of rotating bracket 22A and ratchet 30A. Additionally, spring 31 may remain in an unloaded state while in contact with wall surface 20S.

As illustrated in FIG. 5D, an exemplary ratchet 30A may be rotated away from the front of cutting tool 100 (e.g., toward the material feeding section 2) so as to create deflection in spring 31A against wall surface 20S. Because latch 30 spans the cutting tool 100 so as to translate motion from ratchet 30A to ratchet 30B on the opposite side of the cutting tool 100, the spring 31B on the opposite side of cutting tool 100 will also deflect. Consequently, when rotating bracket 22A is revolved about bolt 16D to orient cutting mechanism 5 via connection/columns 6A/6B, ratchet 30A may be released by the user and moved back into the space between teeth 22T via spring force from spring 31A. Once ratchet 30A is re-engaged with rotating bracket 22A in spaces between teeth 22T (and ratchet 30B is in a similar engagement on the other side of cutting tool 100 with respect to rotating bracket 22B and spaces 22T), then the cutting tool 100 may have a modified position for the moveable cutting mechanism 5 vis-à-vis rotation bracket 21A.

This present invention disclosure and exemplary embodiments are meant for the purpose of illustration and description. The invention is not intended to be limited to the details shown. Rather, various modifications in the illustrative and descriptive details, and embodiments may be made by someone skilled in the art. These modifications may be made in the details within the scope and range of equivalents of the claims without departing from the scope and spirit of the several interrelated embodiments of the present invention.

What is claimed is:

1. A tool, comprising:

a underbody wall structure having an internal wall and two side walls attached to two ends of the internal wall; and a dual-latch mechanism coupled to the underbody wall structure, wherein the dual-latch mechanism comprises:

a first latch configured to moveably couple to the underbody wall structure via a first brace affixed to the internal wall;

a second latch configured to moveably couple to the underbody wall structure on a side opposite of the first latch, via a second brace affixed to the internal wall;

an integral connection translationally moveable with respect to the underbody wall structure and integrally connecting the first latch to the second latch, wherein moving the first latch in a first direction causes the second latch to move in the first direction, wherein the first latch, the second latch and the integral connection are a monolithic part; and a handle connected to the first and second latches and the integral connection for pulling the monolithic part of the first and second latches and the integral connection from a first position in which the monolithic part is closer to the internal wall to a second position in which the monolithic part is farther from the internal wall, wherein each of the first and second braces has a stop to prevent movement of the monolithic part of the first and second latches and the integral connection at certain points; and wherein each stop is deflected downward as the integral connection is brought into contact therewith.

2. The tool of claim 1, wherein the dual-latch mechanism further comprises a first spring interconnecting the first latch to the underbody wall structure and a second spring interconnecting the second latch to the underbody wall structure.

3. The tool of claim 2, wherein the first spring interconnects the first latch to the underbody wall structure at a point between a free end of the first latch and the integral connection and the second spring interconnects the second latch to the underbody wall structure at a point between a free end of the second latch and the integral connection.

4. The tool of claim 3, wherein the first spring interconnects the first latch to the underbody wall structure at the point between the free end of the first latch and the first brace and the second spring interconnects the second latch to the underbody wall structure at the point between the free end of the second latch and the second brace.

5. The tool of claim 1, wherein the handle has an arm connected to the first and second latches and the integral connection via channels.

6. The tool of claim 5, wherein the channels further comprise friction surfaces to prevent accidental displacement of the handle.

7. The tool of claim 1, wherein each stop is located so as to maintain the first and second latches in the first position.

8. The tool of claim 1, wherein each of the first and second braces is a flexible and resilient extension attached to the internal wall, and wherein each stop has sloped surfaces on either side such that when a portion of the integral connection is advanced toward the side of each stop facing toward the internal wall, the integral connection causes each stop and each of the first and second braces to deflect downwardly until the integral connection advances past each stop, and when the portion of the integral connection is brought back toward the side of each stop facing away the internal wall, it causes each stop and its respective brace to once again deflect downwardly until the integral connection is brought to rest atop the first and second braces and behind each stop.

* * * * *